Jan. 17, 1956     E. K. KAPRELIAN     2,730,885
PHOTOFLASH EQUIPMENT
Filed Nov. 5, 1952
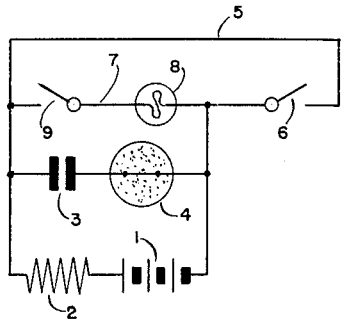
FIG. 1
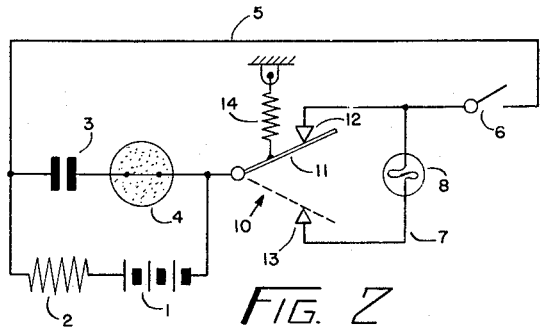
FIG. 2
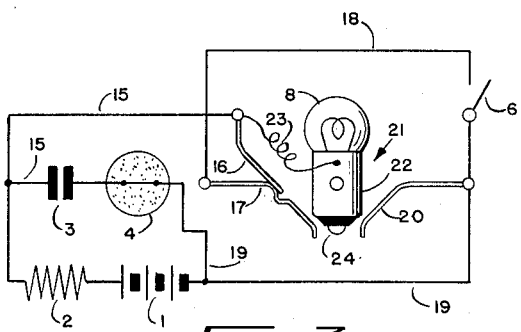
FIG. 3
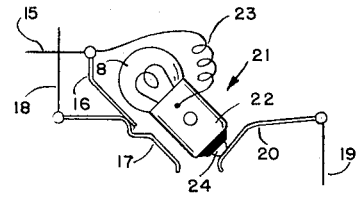
FIG. 4
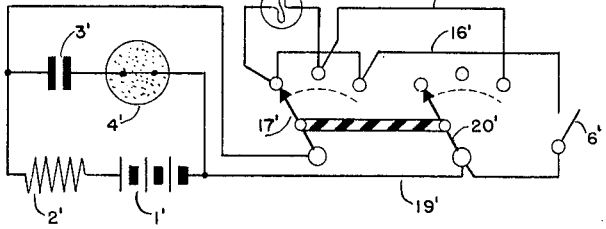
FIG. 5
FIG. 6
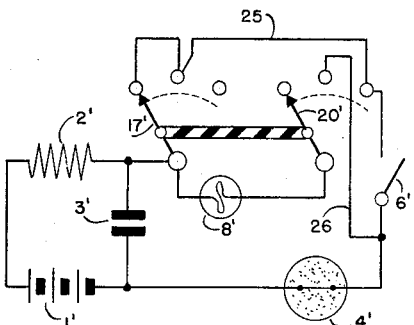
FIG. 8
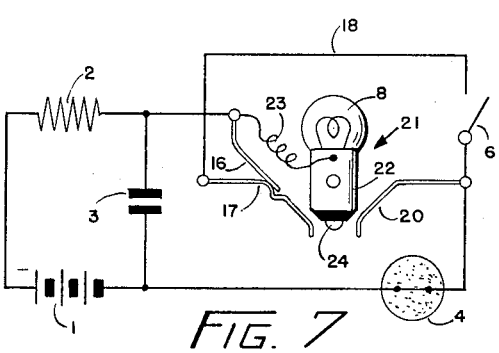
FIG. 7
INVENTOR
EDWARD K. KAPRELIAN
BY
ATTORNEY United States Patent Office 2,730,885
Patented Jan. 17, 1956

2,730,885

PHOTOFLASH EQUIPMENT

Edward K. Kaprelian, Plainville, Conn., assignor to The Kalart Company Inc., Plainville, Conn.

Application November 5, 1952, Serial No. 318,823

12 Claims. (Cl. 67—31)

This invention relates to photoflash equipment, more particularly to photoflash equipment employing as source of energy the so-called B-C system.

The principle of the B-C system involves a circuit system including in series connection a source of current such as one or more batteries, capacitance means, one or more photoflash bulbs and resistance means of comparatively high ohmic resistance value. In such circuit the capacitance means will be charged but cannot cause firing of the bulb or bulbs due to the presence of the resistance means. When now the source of current and the resistance means are short-circuited by closing the switch means included in a circuit connection by-passing the source of current and the resistance means, the capacitance means discharge through the flash bulb or bulbs thereby causing firing of the same. The said switch means may be visualized as being associated with a device for tripping the shutter of the camera and actuating the synchronizer of the photoflash equipment and they may be closed by actuating the release button of the camera.

The B-C system has, among other advantages, the advantage that the energy drained from the battery for each photoflash is merely a quantity of energy just sufficient to charge the capacitance. In other words, the entire energy of the battery is transferred in small uniform doses to the capacitance means so that the energy of a battery can be used to a much higher degree than is possible with photoflash equipment in which the battery is directly used to set off the flash thereby greatly extending the useful life of the battery. Another important advantage of the B-C system is that several bulbs can be fired by means of a small light-weight battery. The firing of a plurality of flash bulbs by direct connection with a battery as the source of current requires the use of batteries so bulky and heavy that they cannot be conveniently carried and also a frequent replacement of the batteries.

The use of a plurality of flash bulbs has become very prevalent in modern flash photography as it permits not only a bright illumination of the object but also the most desirable distribution of the illumination by a judicious placement of the flash bulbs.

As any photographer is well aware, one of the most annoying occurrences that can happen to a photographer is a failure of the flash equipment as such failure may entail an irreplaceable loss of a picture. It has been previously explained that in the B-C system all the flash bulbs and most of the other electric components of the system are connected in a series circuit. Accordingly, a fault in any one of the circuit components, the failure to insert a flash bulb in each one of the series connected sockets or a defective flash bulb will not only result in the loss of a single flash but render inoperative the entire system. Furthermore, the distribution of several flash bulbs over a comparatively large area involves the use of extensive loose wiring which obviously constitutes a possible source of a breakdown of the system due to broken wires, loose contact connections, etc., caused for instance by a person tripping over a loose wire.

Accordingly, it is highly desirable for the photographer to have available a photoflash unit which permits rapidly and conveniently to check the operativeness of the flash unit before an attempt is made to fire the flash bulbs and to trip the camera shutter.

One of the objects of the present invention is to provide a novel and improved photoflash unit employing the B-C system which conveniently and reliably permits checking to determine whether flash bulbs are inserted in all the sockets, whether the primers of all the inserted bulbs are in working condition, whether the capacitor is charged, and whether all the wires are properly connected.

Another object of the invention is to provide means for ascertaining whether the switch means employed for actuating the B-C system of the unit properly open and close their contacts when operated. These switch means are usually the same as are used for tripping the camera shutter by energizing a solenoid so that a check of the switch means affords a test whether the mechanism for tripping the camera shutter is in working condition.

Still another object of the invention is to provide a novel and improved photoflash unit which combines the features of the testing means just described in that the B-C flash circuit and the shutter switch means can be independently tested.

Other and further objects, features and advantages of the invention will be pointed out hereinafter and set forth in the appended claims forming part of the application.

In the accompanying drawing several now preferred embodiments of the invention are shown by way of illustration and not by way of limitation.

In the drawing:

Fig. 1 is a circuit diagram of a testing system for testing the flash circuit of an open B-C system.

Fig. 2 is a circuit diagram of a testing system for testing the shutter switch of a camera included in an open B-C system.

Fig. 3 is a circuit diagram for selectively testing the flash circuit or the shutter switch in an open B-C system;

Figs. 4 and 5 show the signal means of Fig. 3 in different control positions.

Fig. 6 is a testing system similar to Fig. 3 with a modified control of the testing system.

Fig. 7 is a testing system similar to Fig. 3 for a closed B-C system; and

Fig. 8 is a testing system similar to Fig. 6 for a closed B-C system.

Referring first to Fig. 1 in detail, the open circuit system according to this figure comprises a flash circuit including as source of current, a battery 1 such as a hearing aid battery of 22.5 volts, a resistor 2 of comparatively high ohmic resistance value such as 500 to 5000 ohms, preferably about 2000 ohms, a capacitor 3 and a photoflash bulb 4. While only one flash bulb is shown it will be apparent from the previous description that several flash bulbs may be included in the circuit in series connection. The showing of a single flash bulb should be considered as a symbol only. The circuit system further comprises a by-pass circuit 5 connected across the capacitor and the flash bulb and including a normally open switch 6. This switch may be visualized either as being part of the shutter tripping mechanism in that closing of the switch will energize the shutter solenoid for the purpose of tripping the shutter or as the built-in synchronizer switch in a camera shutter. The capacitor and the flash bulb are further connected in series with a testing circuit 7 including a signal means shown as an incandescent light bulb 8 of the type used for instance in flash lights and a normally open test switch 9. The bulb may be a ½ candle power lamp using 12 to 16 volt and having a cold resistance of about 60 ohms.

The testing system as described in connection with Fig. 1 operates as follows:

The battery 1 charges the capacitor 3 through the flash bulb and the resistor but the capacitor charge cannot effect a firing of the flash bulb or bulbs owing to the presence of the high ohmic resistance. As will be observed, in the open B-C circuit system of Fig. 1 the capacitor can be charged only when the charging circuit is completed by the insertion of flash bulbs 4 in all bulb sockets. For the purpose of firing the flash bulb, switch 6 is closed thereby short circuiting the battery and the resistor so that the capacitor now discharges through the flash bulb or bulbs and causes firing of the same. In order to test whether the entire flash circuit is in working condition and is closed by the insertion of a flash bulb in each socket provided for this purpose the test switch 9 is closed. As a result, the capacitor discharges through the flash bulb or flash bulbs and the test lamp 8. A flicker of the test lamp then indicates that the flash circuit is in working condition and ready for producing a flash. As will be apparent, the ohmic resistance of the filament of test lamp 8 is sufficient to prevent a firing of the flash bulb or bulbs when the circuit is tested.

It will be obvious that the test circuit of Fig. 1 does not only test whether the battery is capable of charging the capacitor but also by the inclusion of the flash bulbs in the test circuit whether the flash bulbs inserted in the flash circuit are in working condition. Any flash bulb having a defective primer filament will prevent an action of the signal means.

In the circuit system of Fig. 2 corresponding components are designated by the same numerals. As previously mentioned, the circuit system of Fig. 2 is designed to test the shutter switch 6. For this purpose a test switch means generally designated by 10 is provided. This testing switch is shown as having a movable contact arm 11 engageable either with a contact 12 or a contact 13. Closing of contact 12 establishes the by-pass circuit 5 for firing the flash bulb or bulbs by short circuiting resistance 2 and battery 1 upon closing of the shutter switch 6 and closing of contact 13 by contact arm 11 establishes the testing by-pass circuit 7. As will be apparent, in the circuit system of Fig. 2 the testing circuit, which is actuated in the circuit system of Fig. 1 by closing of switch 9, now includes the shutter switch 6 in series connection with capacitor 3 and flash bulb or bulbs 4. Accordingly, closing of switch 6 with the contact arm 11 in the position engaging the contact 13 tests not only capacitor 3, the flash bulbs and the wiring connections therefor but also the shutter switch 6 as the light bulb 8 cannot show a flicker unless the contacts of switch 6 are in working condition.

The test switch 10 is preferably so arranged that its contact arm is biased to engage contact 12 in the flash circuit as is indicated by a biasing spring 14. For the purpose of testing, contact arm 11 is moved into engagement with contact 13 and switch 6 is closed.

The circuit system of Fig. 3 combines the testing features of the circuit systems of Figs. 1 and 2. For this purpose three by-pass circuits are provided. The first by-pass circuit is the flash circuit. It extends from one terminal of capacitor 3 through a wire 15, a spring contact 16, a second spring contact 17 biased into engagement with contact 16, a wire 18, switch 6 and a wire 19 to one of the terminals of the flash bulb 4 connected in series with capacitor 3. As will be apparent, closing of switch 6 short-circuits battery 1 and resistor 2 thereby causing firing of the flash bulb or bulbs. The second by-pass circuit is the test circuit for testing the flash circuit in correspondence with the test effected by the circuit system of Fig. 1. This second bypass circuit extends from the outer terminal of capacitor 3 through wire 15, the testing switch means generally designated by 21, a third spring contact 20 and wire 19 to the outer terminal of flash bulb 4. The third by-pass circuit is the circuit for testing the shutter switch 6 similarly to the circuit system of Fig. 2 and extends from the outer terminal of capacitor 3 through wire 15, the test switch means 21, spring contact 17, wire 18, shutter switch 6 and wire 19 to the outer terminal of flash bulb 4.

The test switch 21 of Fig. 3 serves to prepare the flash by-pass circuit for actuation by closing switch 6 and selectively to close either one of the two testing circuits. Of course, the testing of the shutter switch 6 additionally requires a closing of the said switch. For this purpose, the testing switch 21 comprises a movable contact member which may take any suitable shape. According to the now preferred embodiment of the invention the test lamp is so designed that it together with spring contacts 16, 17 and 20 constitutes the test switch 21. As is shown, the test lamp is pivotally mounted and its base 22 is connected by a flexible wire such as a pigtail 23 with the junction point between the wire 15 and contact spring 16. The bottom terminal 24 of the light bulb can be moved either into engagement with contact spring 20 as is shown in Fig. 4 or into engagement with contact spring 17 as is shown on Fig. 5. This figure also shows that contact springs 16 and 17 are separated when the bottom terminal of the test lamp engages spring 17. Finally, in the upright position of the test lamp the bottom terminal engages neither of the two contact springs 17 and 20 as is shown in Fig. 3. The test lamp is normally biased into the upright position for instance by suitable spring means, not shown.

An examination of the circuit connections, as shown on Figs. 3, 4 and 5, will make it apparent that in the position of the test lamp as shown in Fig. 3 the flash circuit is prepared for firing by closing switch 6; that in the test lamp position of Fig. 4 the flash circuit is tested by a flicker of test lamp 8; and that in the test bulb position of Fig. 5 the test circuit is prepared for testing the shutter switch 6 by closing the latter.

It will be evident from the previous description that the lamp base and the bottom terminal of the lamp operate in effect as the movable contact member of a switch and that instead of using the test lamp proper as a component of the test switch means an independent switch means may be provided for control of the testing system. Fig. 6 shows such switch means.

The circuitry of the system of Fig. 6 is the same as in Fig. 3 as can be easily ascertained by a tracing of the respective circuits. To facilitate an understanding of the system of Fig. 6, corresponding components of the system are designated by the same numerals though primed. As will be apparent, the two spring contacts 17 and 20 of Fig. 3 are shown in Fig. 6 as two movable contact arms 17' and 20' which can be jointly moved by any suitable means here shown as an insulation bar. Each of the contact arms can engage one of three contacts. As will be noted, two of the contacts with which contact 20' co-acts are blind contacts which are shown for reason of symmetry.

As will be apparent, from a tracing of the system of Fig. 6, engagement of contact arm 17' with its left hand contact corresponds to the position of the flash bulb shown in Fig. 3, that is the flash circuit is prepared and the flash bulb is discharged by closing of switch 6'.

Engagement of contact arm 17' with the middle contact corresponds to the position of the bulb as shown on Fig. 5 in which the switch contacts are tested by closing switch 6'.

Finally, engagement of contact arm 17' with its right hand contact and of contact arm 20' with its right hand contact corresponds to the bulb position as shown on Fig. 4 in which the continuity of the flash circuit is tested.

Fig. 7 is similar to Fig. 3 in that the several circuits are closed or prepared by the position of bulb 8. It differs from Fig. 3 in that Fig. 3 shows an open B-C system and Fig. 7 a closed B-C system. As will be noted, in Fig. 3 the charging circuit of capacitor 3 is closed only when the flash bulbs are inserted in the respective sockets while in Fig. 7 the charging circuit is continuously closed irrespectively whether flash bulbs are inserted or not.

The operation of the system of Fig. 7 will be obvious from the previous description.

Fig. 8 shows a closed B-C system similar to Fig. 7 with a control switch as described in connection with Fig. 6. The circuit system of Fig. 8 is completed by wires 25 and 26. The operation of the system will be obvious from the previous description of Figs. 6 and 7.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover al such changes and modifications in the appended claims.

What is claimed as new and desired to be secured by Letters Patent is:

1. In a B-C photoflash unit having a charging circuit including in series connection capacitance means, a source of current for charging the capacitance means and resistance means, and further comprising at least one socket for a photoflash bulb and a flash circuit by-passing the source of current and the resistance means and including normally open switch means for short circuiting the source of current and the resistance means and connecting the photoflash bulb socket across the capacitance means upon closing of said switch means thereby discharging the capacitance means through a flash bulb inserted in said socket for firing the bulb, a testing circuit connecting in series said capacitance means, said flash bulb, signal means and normally open test switch means for discharging the capacitance means through the flash bulb and the signal means upon closing of the test switch means thereby actuating the signal means, the said signal means having an ohmic resistance value such as to prevent a firing of the flash bulb upon closing of the test switch means.

2. In a B-C photoflash unit including in series connection capacitance means, a source of current for charging the capacitance means, resistance means and at least one socket for a photoflash bulb, and a flash circuit by-passing the source of current and the resistance means and including normally open actuating switch means for short circuiting the source of current and the resistance means by closing said switch means thereby discharging the capacitance means through a flash bulb inserted in said socket for firing the bulb, a testing circuit connecting in series said capacitance means, said flash bulb, signal means and normally open test switch means for discharging the capacitance means through the flash bulb and the signal means upon closing of the test switch means thereby actuating the signal means, the said signal means having an ohmic resistance value such as to prevent a firing of the flash bulb upon closing of the test switch means.

3. In a B-C photoflash unit including in series connection capacitance means, a source of current for charging the capacitance means, resistance means and at least one socket for a photoflash bulb, and a flash circuit by-passing the source of current and the resistance means and including normally open actuating switch means for short circuiting the source of current and the resistance means by closing said switch means thereby discharging the capacitance means through a flash bulb inserted in said socket for firing the bulb, a testing circuit connecting in series said capacitance means, said flash bulb, signal means in form of an incandescent light bulb and test switch means, the said test switch means being arranged selectively to close either first contact means included in said flash circuit for short circuiting the source of current and the resistance means upon closing the actuating switch means included in said flash circuit thereby discharging the capacitor means through the flash bulb or second contact means connecting said capacitance means, said flash bulb and said signal means in series with said actuating switch means for discharging the capacitance means through the signal means, the flash bulb and the actuating switch means upon closing of the said last mentioned switch means thereby actuating the signal means, the said signal means having an ohmic resistance such as to prevent a firing of the flash bulb upon closing of the actuating switch means for the purpose of actuating the signal means.

4. A photoflash unit according to claim 3, wherein the said test switch means comprise a movable switch member movable between the said two contact means and baised to engage the contact means included in the circuit for short circuiting the source of current and the resistance means by closing the actuating switch means.

5. In a B-C photoflash unit including in series connection capacitance means, a source of current for charging the capacitance means, resistance means and at least one socket for a flash bulb in combination, a flash circuit by-passing the source of current and the resistance means and including normally open actuating switch means; a first test circuit for testing the flash circuit and including in series connection the capacitance means, a flash bulb inserted in said socket and signal means; a second test circuit for testing the actuating switch means and including in series connection the capacitance means, the flash bulb, the signal means, and the actuating switch means; and test switch means controlling three contact means one in each of the said three circuits for selectively closing one of the said three circuits, closing of the contact means included in the flash circuit preparing the same for firing of the bulb upon closing of the actuating switch means, closing of the contact means included in the first test circuit causing actuation of the signal means through the flash bulb, and closing of the contact means included in the second test circuit causing actuation of the signal means through the flash bulb and the actuating switch means upon closing of the latter switch means also, the said signal means having an ohmic resistance such as to prevent firing of the flash bulb upon closing of the test switch means.

6. A photoflash unit according to claim 5, wherein the said signal means comprise an incandescent light bulb.

7. A photoflash unit according to claim 5, wherein the said test switch means comprise a movable contact member coacting with the said three contact means so as to prepare in one position the flash circuit for closing by the actuating switch means and to close in a second position the first test circuit and to prepare in a third position the second test circuit for the purpose aforesaid.

8. A photoflash unit according to claim 5, wherein the said test switch means comprise a first contact means included in the flash circuit, a second contact means included in the second test circuit, and a third contact means included in the first test circuit, the said first and second contact means being movable relative to each other and biased into engagement, engagement of the said first and second contact means preparing the flash circuit for closing by the actuating switch means, and a movable contact member engaging in one position said second contact means for separating the first and second contact means thereby closing the second test circuit, in a second position engaging said third contact means for closing the first test circuit, and being disengaged from all the contact means in a third position thereby releasing the first and second contact means for engagement, the said movable contact member being connected to a circuit point common to all three circuits.

9. A photoflash unit according to claim 8, wherein the said signal means comprise an incandescent light bulb having a base terminal and a bottom terminal, the said bulb being movably mounted and the said terminals forming said movable contact member.

10. A photoflash unit according to claim 9, wherein the said light bulb is tiltably mounted in a spatial relationship relative to the said three contact means such that in one position of tilt the bottom terminal of the light bulb engages the second contact means thereby disengaging the first and second contact means, in another position of tilt engages the third contact means and in a third position of tilt is disengaged from all the three contact means for the purposes aforesaid.

11. In a B-C photoflash unit, a charging circuit including in series connection, capacitance means, a source of current for charging the same and resistance means; a flash circuit including at least one socket for a flash bulb and normally open switch means connected with the charging circuit so as to connect a flash bulb inserted in said socket across the capacitance means and short circuiting the source of current and the resistance means upon closing of the switch means; a first test circuit for testing the flash circuit and including in series connection the capacitance means, the flash bulb and signal means; a second test circuit for testing the actuating switch means and including in series connection the capacitance means, the flash bulb, the signal means, and the actuating switch means; and test switch means controlling three contact means included in said flash circuit and said test circuits for selectively closing one of the said three circuits, closing of the contact means included in the flash circuit preparing the same for firing of the bulb upon closing of the actuating switch means, closing of the contact means included in the first test circuit causing actuation of the signal means through the flash bulb, and closing of the contact means included in the second test circuit causing actuation of the signal means through the flash bulb and the actuating switch means upon closing of the latter switch means also, the said signal means having an ohmic resistance such as to prevent firing of the flash bulb upon closing of the test switch means.

12. A photoflash unit according to claim 11, wherein the said test switch means comprise a movable contact member coacting with the said three contact means so as to prepare in one position the flash circuit for closing by the actuating switch means and to close in a second position the first test circuit and to prepare in a third position the second test circuit for the purpose aforesaid.

References Cited in the file of this patent

UNITED STATES PATENTS

| | | |
|---|---|---|
| 2,290,264 | Wuerfel | July 21, 1942 |
| 2,395,600 | Weisglass | Feb. 26, 1946 |
| 2,625,863 | Kirwin | Jan. 20, 1953 |
| 2,639,318 | Des Roches | May 19, 1953 |